Nov. 9, 1954 A. R. CHASAR 2,693,966
SELF-TIGHTENING QUICK-RELEASING CHUCK
Filed April 28, 1950
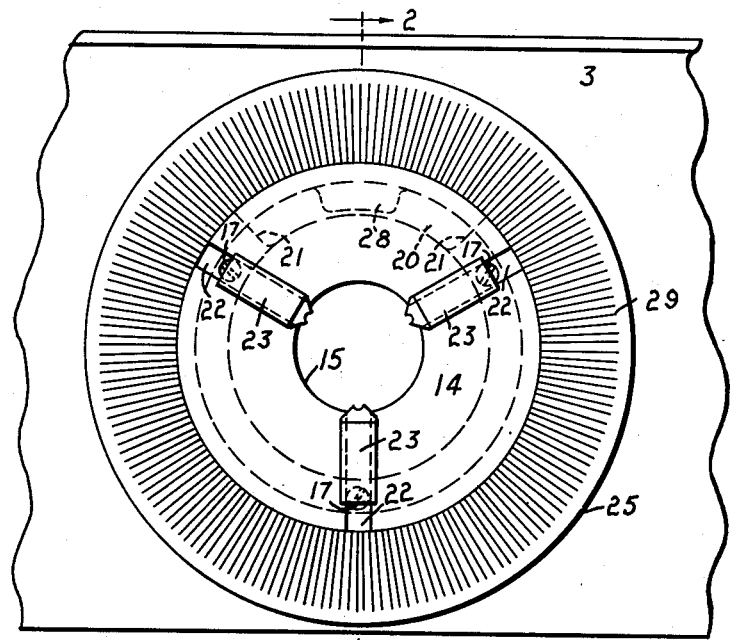
FIG. 1
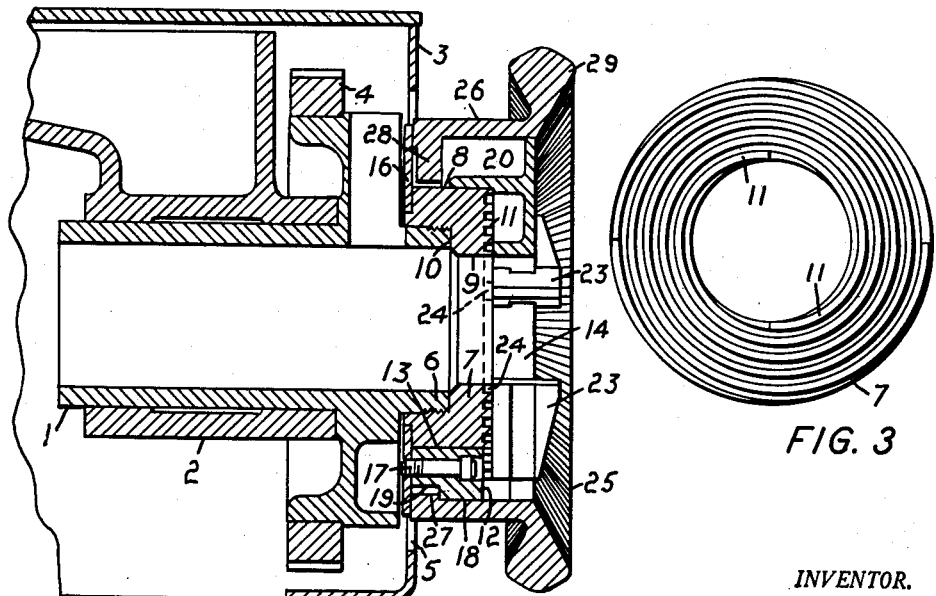
FIG. 2
FIG. 3
INVENTOR.
Anthony R. Chasar
BY Evans & McCoy
Attorneys

United States Patent Office 2,693,966
Patented Nov. 9, 1954

2,693,966

SELF-TIGHTENING QUICK-RELEASING CHUCK

Anthony R. Chasar, Cleveland, Ohio, assignor to The Oster Manufacturing Company, Cleveland, Ohio, a corporation of Ohio Application April 28, 1950, Serial No. 158,742

5 Claims. (Cl. 279—114)

The device of the present invention is a self tightening, quick releasing chuck particularly useful in screw thread cutting machines for clamping a pipe or rod during the threading operation.

The chuck body is rotatably mounted on the spindle and the clamping jaws which move radially in the chuck body have teeth meshing with a scroll that is fixed to the spindle. The chuck body is driven through the scroll and torsional thrusts exerted by the cutting tool on the work tend to turn the chuck body on the spindle and increase the gripping pressure exerted on the work by the clamping jaws.

A hand wheel rotatably mounted on the spindle has an impact driving connection with the chuck body, so that the work can be instantly released during rotation of the spindle by imparting a forward flip to the hand wheel.

The invention has for its object to provide a chuck of simple and inexpensive construction which can be instantly clamped to a work piece or released from the work piece during rotation of the spindle.

Reference should be had to the accompanying drawings forming a part of this specification in which:

Figure 1 is a front elevation of a chuck embodying the invention;

Fig. 2 is a section taken on the line indicated at 2—2 in Fig. 1; and

Fig. 3 is a plan view of the spirally grooved face of the scroll.

In the accompanying drawings the chuck of the present invention is shown applied to a tubular spindle 1 that is journaled in a suitable bearing 2 in a housing 3. A gear 4 within the housing 3 is shown attached to the spindle and this gear may be driven from a motor through any suitable gearing. The housing 3 has an opening 5 through which the spindle 1 projects and the spindle 1 has a threaded end 6 upon which is screwed a scroll 7.

The scroll 7 has a cylindrical periphery 8 and a central opening 9 which is concentric with the tubular spindle 1. The scroll 7 is cup-shaped, having a tubular portion to receive the spindle 1 and a shoulder 10 around the opening 9 which engages with the end of the spindle. The outer face of the scroll is spirally grooved providing spiral threads 11.

Since the chuck is driven through the scroll and is self-tightening, it is desirable that the spiral threads 11 have a greater lead than would be provided by the usual single spiral thread. In scroll chucks the scroll is ordinarily relied upon to lock the jaws in clamping position by its wedging action on the jaw teeth. In the chuck of the present invention, however, the torsional thrust on the work increases the clamping pressure of the jaws and less wedging action is necessary. By increasing the lead of the scroll the force required to release the clamping jaws is greatly reduced. As herein shown the two spiral threads 11 are provided on the face of the scroll wheel so that the lead of the scroll is double that which would be provided with a single spiral thread.

A chuck body 12 has a tubular bearing portion 13 that is journaled on the cylindrical periphery 8 of the scroll 7. The body 12 has an outer portion 14 that overlies the grooved face of the scroll and a central opening 15 that registers with the central opening 9 of the scroll.

The chuck body 14 has a retaining disk 16 attached to its inner end by means of bolts 17, and this disk which is of annular form overlies the inner end of the scroll 7 to hold the chuck body against axial movements with respect to the scroll. The chuck body has a cylindrical periphery 18 and a portion 19 at its inner end adjacent the disk 16 which is of reduced diameter, the portion 19 and disk 16 forming a peripheral recess. A circumferentially extending recess 20 is provided in the cylindrical periphery of the chuck body, and the ends of this recess are substantially radially disposed to provide impact shoulders 21.

The outer portion 14 of the chuck body is provided with radial ways 22 in which clamping jaws 23 are slidably mounted. The ways 22 open at their inner ends to the central opening 15 of the chuck body, and at their outer ends to the periphery 18 of the chuck body, and each of the jaws 23 has spaced teeth 24 on its inner edge that mesh with the spiral threads 11 on the face of the scroll 7.

A hand wheel 25 is provided with a hub portion 26 that is journaled on the cylindrical periphery 18 of the chuck body, the hub portion 26 having a short inwardly projecting flange at its inner end that extends into the recess formed by the retaining disk 16 and the reduced inner end 19 of the chuck body to hold the hand wheel against axial movements with respect to the chuck body. The hub portion 26 of the hand wheel closes the outer ends of the ways 22 and limits the radial outward movements of the clamping jaws 23. The hub 26 of the hand wheel has an inwardly projecting impact lug 28 that projects into the circumferential recess 20 in the chuck body and which is engageable with either of the impact shoulders 21 of the chuck body. The shoulders 21 and lug 28 provide stops for limiting the turning movements of the hand wheel with respect to the chuck body and provide an impact driving connection between the hand wheel and the chuck body. The hand wheel has a relatively heavy circumferentially continuous hand grip portion 29 that projects outwardly from the hub portion 26. The hand gripping portion 29 provides a peripherally disposed weight on the hand wheel, so that sufficient momentum may be imparted to the hand wheel to cause a sharp blow to be struck by the impact lug 28 against a shoulder 21 of the chuck body to release the clamping jaws from the work.

In operation a pipe or rod to be threaded is inserted axially through the hollow spindle into the space between the clamping jaws 23 and the hand wheel 29 is turned to cause the jaws to lightly clamp the tube or rod. Rotation is then imparted to the spindle and the thread cutting tools are brought into engagement with the pipe or rod. The engagement of the cutting tool with the pipe or rod tends to retard rotation and the torsional thrust so created acts through the scroll 7 to increase the pressure of the jaws 23 on the work.

As soon as the threading operation is completed the operator imparts a forward flip to the hand wheel 25, causing the impact lug 28 of the hand wheel to strike against the forward impact shoulder 21 of the chuck body, causing the chuck body to have a forward turning movement with respect to the scroll which moves the clamping jaws 23 radially outwardly to release the work.

In pipe and rod threading machines the work holding spindle is usually driven at a speed of not more than 50 R. P. M. At any speed less than 100 R. P. M. the operator can easily flip the hand wheel 25 to impart a velocity thereto enough greater than the speed of the spindle to release the clamping jaws 23 by impact of the lug 28 against the forward shoulder 21 of the chuck body.

In pipe threading machines a cut-off is commonly provided adjacent the threading die, so that a portion of the pipe can be cut off after each threading operation.

The chuck of the present invention can be instantly released after the threaded portion has been cut off, and the pipe can be pulled forward the desired amount without stopping rotation of the spindle. When the pipe is properly positioned clamping may be effected by merely retarding rotation of the hand wheel 25.

It is to be understood that in accordance with the provisions of the patent statutes, variations and modifications of the specific devices herein shown and described may be made without departing from the spirit of the invention.

What I claim is:

1. A self tightening and quick releasing chuck comprising a rotary spindle mounted for continuous rotation in one direction, a scroll fixed to said spindle and having a spirally grooved face normal to the spindle axis, a chuck body rotatably mounted on the spindle and provided with radial ways, clamping jaws slidably mounted in said ways and having teeth meshing with the grooved face of the scroll, whereby said jaws are moved radially by turning movements of the chuck body on the spindle, and means for tightening and releasing said clamping jaws during rotation of said scroll and said spindle in said one direction comprising a hand wheel rotatable on said spindle and provided with a circumferentially continuous handgrip portion radially outwardly of said chuck body and said clamping jaws, and impact stops on said hand wheel and chuck body engageable to limit turning movements of the hand wheel with respect to the chuck body and providing an impact driving connection between said hand wheel and chuck body, rotation of said handwheel in said one direction and at a velocity greater than that of said spindle causing engagement of said impact stops to impart radial movement to said jaws to release the same during rotation of the spindle, and retardation of said handwheel to reduce its velocity below that of the spindle causing radial movement of the jaws in the opposite direction to tighten the same during rotation of the spindle.

2. A self tightening and quick releasing chuck comprising a tubular spindle mounted for continuous rotation in one direction, a scroll fixed to an end of said spindle for rotation therewith, said scroll having an opening concentric with the spindle and a spirally grooved outer face surrounding said opening, a chuck body rotatably mounted on said scroll and having a portion overlying said grooved face and provided with radial ways, clamping jaws slidably mounted in said ways and having teeth meshing with said grooved face, whereby said jaws are moved radially in response to rotation of said chuck body with respect to said spindle, and means for tightening and releasing said jaws during rotation of said spindle and the scroll carried thereby in said one direction comprising a hand wheel rotatably mounted on the chuck body and provided with a circumferentially continuous handgrip portion radially outwardly of said chuck body, and impact stops on said hand wheel and chuck body engageable to limit turning movements of the hand wheel on said chuck body and providing an impact driving connection between said hand wheel and chuck body, rotation of said handwheel in the direction of rotation of said spindle and at a greater velocity causing engagement of said impact stops to impart radial movement to said jaws to release the same during rotation of the spindle and retardation of said handwheel causing radial movement of the jaws in the opposite direction to tighten the same during rotation of the spindle.

3. A self tightening and quick releasing chuck comprising a spindle mounted for continuous rotation in one direction, a scroll fixed to said spindle for rotation therewith and having a face normal to the spindle axis that is spirally grooved to provide multiple spiral threads, a chuck body rotatable on the spindle, clamping jaws mounted for radial movements on said body and having teeth meshing with the grooved face of the scroll, whereby said jaws are moved radially by turning movements of the chuck body on the spindle, and means for tightening and releasing said clamping jaws during rotation of said spindle and the scroll carried thereby in said one direction comprising a hand wheel rotatable on the spindle and having a peripheral hand grip portion, and impact stops on said hand wheel and chuck body for limiting the turning movements of the hand wheel with respect to the body and providing an impact driving connection between the hand wheel and chuck body, rotation of said handwheel in said one direction and at a velocity greater than that of said spindle causing engagement of said impact stops to impart radial movement to said jaws in a direction to release the same and retardation of said handwheel to reduce its velocity below the velocity of the spindle imparting radial movement to the jaws in a direction to tighten the same.

4. A self tightening and quick releasing chuck comprising a spindle mounted for continuous rotation in one direction, a scroll having a cylindrical periphery, a tubular internally threaded inner end screwed upon the spindle and an outer spirally grooved face normal to the spindle axis, a chuck body journaled on the cylindrical periphery of the scroll and having portions overlying the inner and outer ends of the scroll, said body having a cylindrical periphery, clamping jaws mounted for radial movement in said body and having teeth meshing with the grooved face of said scroll, whereby said jaws are moved radially in response to rotation of said chuck body with respect to said scroll and said spindle, and means for tightening and releasing said clamping jaws during rotation of said scroll and said spindle in said one direction comprising a hand wheel having a hub portion journaled on the cylindrical periphery of said chuck body and a relatively heavy peripheral hand grip portion outwardly of said hub, and impact stops carried by said chuck body and hand wheel that limit the turning movements of the hand wheel on said body and that provide an impact driving connection between the hand wheel and chuck body, rotation of said handwheel in said one direction and a velocity greater than that of said spindle causing engagement of said impact stops to impart radial movement to said jaws in a direction to release the same, and retardation of said handwheel to reduce its velocity below that of the spindle causing radial movement of the jaws in a direction to tighten the same.

5. A self tightening and quick releasing chuck comprising a spindle mounted for rotation in one direction, a scroll fixed to an end of said spindle and having an external bearing surface coaxial with the spindle, said scroll having a spirally grooved outer face normal to the spindle axis, a chuck body having a bearing portion journaled on the peripheral surface of said scroll and a portion extending radially inwardly over the grooved face of said scroll, said body having a peripheral bearing portion coaxial with the spindle and radial ways opening to its periphery, the bearing portion of said body having a circumferentially extending recess providing impact shoulders at its ends, clamping jaws slidable in said ways and having teeth in mesh with the grooved face of said scroll, whereby said jaws are moved radially in response to rotation of said chuck body on the spindle, and means for tightening and releasing said jaws during rotation of said spindle in said one direction comprising a hand wheel having a hub portion journaled on the bearing portion of said body and closing the outer ends of said radial ways to limit outward movements of said jaws, said hand wheel having a relatively heavy peripheral hand grip portion outwardly of its hub portion and an impact lug projecting into said recess in the chuck body and engageable with said impact shoulders to impart turning movements to the chuck body, rotation of said handwheel in the direction of rotation of said spindle and at a greater velocity causing engagement of said impact lug with one of said impact shoulders to impart radial movement to said jaws in a direction to release the same, and retardation of said handwheel to reduce the velocity thereof below that of the spindle causing engagement of said impact lug with the other of said impact shoulders to impart radial movement to said jaws in a direction to tighten the same.

References Cited in the file of this patent

UNITED STATES PATENTS

| Number | Name | Date |
|---|---|---|
| 134,259 | Cushman | Dec. 24, 1872 |
| 316,713 | Whiton | Apr. 28, 1885 |
| 341,278 | Sands | May 4, 1886 |
| 1,251,558 | Morrow | Jan. 1, 1918 |
| 1,699,359 | Hay | Jan. 15, 1929 |
| 1,764,289 | Emrick | June 17, 1930 |
| 2,429,524 | Oetzel | Oct. 21, 1947 |
| 2,588,938 | Rogers | Mar. 11, 1952 |